3,232,896

COMPOSITIONS CONTAINING POLYAMIDES DERIVED FROM 1,4-CYCLOHEXANEBISMETHYLAMINE

Alan Bell, James G. Smith, and Charles J. Kibler, Kingsport, Tenn., assignors to Eastman Kodak Company, Rochester, N.Y., a corporation of New Jersey
No Drawing. Filed Nov. 27, 1963, Ser. No. 326,391
5 Claims. (Cl. 260—29.2)

This invention relates to compositions composed of polyamides and copolyamides obtained by the interaction of pimelic acid with 1,4-cyclohexanebismethylamine which are useful as coating compositions, as film and sheet-forming compositions and as impregnating solutions.

Polyamides derived from cyclohexanebismethylamine useful in the manufacture of fibers, yarns, fabrics, films, extruded objects, supports for photographic emulsions, molding and coating compositions and other purposes are known to the art. Such compositions are described, for example, in the U.S. patent to Bell, Smith and Kibler No. 3,012,994, issued December 12, 1961, in which we are coinventors. In further work on such polyamides, we have discovered that especially valuable coating and other compositions may be prepared from pimelic acid and mixtures of the cis and trans isomers of cyclohexanebismethylamine in which there is a special relationship between the ratio of the cis to the trans isomer and that such specific compositions are unexpectedly soluble in aqueous alcohol to form valuable coating, sheet-forming, impregnating and other useful compositions.

1,4-cyclohexanebismethylamine is a known chemical compound the preparation of which is described in Ber. 71B, 759 (1938), Malachowski, Wasowska and Jockiewics). Polyamides derived from this amine are described in the above-mentioned U.S. patent to Bell, Smith and Kibler, 3,012,994. Compositions of the specific type hereinafter described are not described in this patent nor in any other chemical or patent literature of which we are aware.

This invention has as its principal object to provide coating compositions which are useful, not only for coating various surfaces, but also for employment as film and sheet-forming compositions and as impregnating solutions.

A further object is to provide compositions of the type referred to in the preceding paragraph which are especially useful in the coating of surfaces composed of or containing polyethylene, as for example, polyethylene sheeting, to render it capable of employment as a packaging material for food products and to enable it to preserve the natural flavor and aroma particularly of such products as coffee, tea and similar items which often lose both flavor and aroma when packaged in various types of standard packaging materials.

A further object is to provide polyamide impregnating solutions which may be employed to cause the polyamide component thereof to penetrate a plastic or non-plastic sheet material and, after evaporation of solvent, to be retained therein to provide a resistance to vapor or gas transmission similar to that obtained by coating merely the surface of a sheeting material with the material.

A still further object is to provide novel polyamides and copolyamides from 1,4-cyclohexanebismethylamine Other objects will appear hereinafter.

Our invention is based upon the discovery that when certain polyamides and copolyamides prepared from 1,4-cyclohexanebismethylamine and pimelic acid in such a way that the final polyamide contains a mixture of the cis and trans isomers containing a minimum of 60 percent and a maximum of 90 percent of the cis stereo isomer and a maximum of 40 percent and a minimum of 10 percent of the trans isomer, and preferably a mixture in which the range of the cis isomer is from 70 to 80 percent, such polyamide or copolyamide compositions are soluble in aqueous ethanol containing up to about 25–15 percent water by volume and that by dissolving such amides in such aqueous ethanol valuable, coating, film and sheet-forming and impregnating solutions or dopes can be made. As indicated, these polyamides are prepared from pimelic acid and our work indicates that the polyamides useful for the purposes of our inveintion as set forth above are limited to those derived from this specific acid. Solubility in aqueous ethanol of polyamides derived from pimelic acid is most unexpected since similar polyamides from adipic, azelaic and sebacic acids do not show any appreciable solubility in aqueous ethanol. Likewise, it is surprising and unexpected to find that copolyamides of pimelic acid and 1,4-cyclohexanebismethylamine (60–90 percent cis isomer) with up to 25 mole percent of a second or modifying acid such as adipic, azelaic, sebacic, β-methyl adipic and other aliphatic dicarboxylic acids containing from 2–20 carbon atoms show the same remarkable solubility in aqueous ethanol.

As indicated above, dopes or coating compositions of the polyamide or copolyamide compositions of our invention are obtained by agitating the granulated polymer in the aqueous ethanol solvent at a temperature which may range from room temperature to 50° C. for several hours. Fifteen grams of polymer can easily be dissolved in 100 ml. of the solvent, and solutions containing as much as 22.5 g. of polymer per 100 ml. of solvent can frequently be obtained. More concentrated solutions can be obtained at 50° C. but these have a tendency to gel soon after cooling to room temperature.

In the following examples and description we have set forth several of the preferred embodiments of our invention but they are included merely for purposes of illustration and not as a limitation thereof.

EAMPLE I

*Preparation of the polyamide salt.*—Pimelic acid (4.7 moles, 752 g.) was dissolved in 4000 ml. of absolute ethanol with gentle heating. This solution was stirred vigorously and 710 g. (5.0 moles) of 1,4-cyclohexanebismethylamine (71 percent cis) dissolved in 1000 ml. of absolute ethanol was added rapidly. The polyamide salt began precipitating after approximately half the diamine was added. The mixture was stirred for an hour, cooled and filtered. The salt, poly(1,4-cyclohexanebismethylammonium pimelate) (71 percent cis diamine) was air dried, weight 1425 g. (theory 1430 g.).

EXAMPLE II

*Preparation of polyamide.*—Forty grams of the salt prepared in Example I was charged into a 250 ml. flask equipped with stirrer and nitrogen sweep. Fifty ml. of distilled m-cresol was added and the mixture stirred. The flask was immersed in a metal bath pre-heated to 200° C. It was stirred at this temperature for one hour and then the bath temperature was raised to 300° C. over a one hour period. A vacuum of less than 1 mm. of mercury was then applied for 10 minutes to complete the removal of cresol. A viscous pale yellow melt remained, which was poly(1,4-cyclohexanebismethylpimelamide) (71 percent cis diamide). On cooling, the material was found to have a viscosity of 1.10 and a flow point of 180–200° C.

EXAMPLE III

*Preparation of polyamide under pressure.*—An autoclave was charged with 700 g. of the polyamide salt prepared in Example I and 150 ml. of water. The autoclave was heated to 100–110° C. and steam allowed to escape in order to purge the autoclave of air. It was then sealed and heated 1.5 hrs. at 225° C. and 250 p.s.i.g., then 1.5 hrs. at 275° C. and 250 p.s.i.g. and finally 0.5 hr. at 275° C. and 0 p.s.i.g. under nitrogen. The final polymer which was poly(1,4-cyclohexanebismethylpimelamide) (71 percent cis diamine) had a viscosity of 1.34.

EXAMPLE IV

*Preparation of dopes.*—Three grams of the polyamide prepared in Example II was placed in a 2 oz. bottle together with 20 ml. of aqueous ethanol (30 percent ethanol, 20 percent water by volume). The bottle was rotated slowly at room temperature. Solution was rapid and a moderately viscous clear dope was formed in five hours. The bottle was opened and an additional 1.5 g. of polyamide was added. The bottle was then rotated for a further twelve hours at room temperature. Solution was incomplete. The mixture was then immersed in a water bath held at 50° C. and rotated for an additional five hours. The remainder of the polyamide dissolved giving a viscous clear dope which proved to be stable at room temperature for several days.

More concentrated solutions of the polyamide (6.0 g. in 20 ml. aqueous ethanol) can be prepared at 50° C. but they tend to gel after 6 to 20 hours at room temperature.

The following table embodies the pertinent data of additional examples of our invention and illustrates, among other items, the range of cis-trans ratios of the polyamides and copolyamides of these novel compositions, their solubility in aqueous ethanol, the compositions of the polyamides and copolyamides and the concentrations in various dopes or coating, sheet-forming or impregnating solutions prepared in accordance therewith.

1,4-cyclohexanebismethylamine content, the solubility of the copolyamide in aqueous ethanol is low.

EXAMPLE XVII

A dope was prepared by dissolving 14.5 g. of the polyamide from pimelic acid and 1,4-cyclohexanebismethylamine (68 percent cis) in 65 ml. of aqueous ethanol (80 percent by volume ethanol) at 50° C. The dope was filtered, a 20 mil layer spread on a glass plate and the film dried overnight. Complete drying was obtained by heating the film at 50° C. for several hours.

The final film was peeled from the glass film and the following properties determined (thickness of tested film 3.0 mils):

Tensile strength _____p.s.i__ 10,600
Elastic modulus _____p.s.i__ 3.8×10⁵
Elongation _____percent__ 3.7
Heat distortion temp. (2 percent) _____° C__ 96

Films having the above physical properties can be used in a large number of commercial applications. For example, they are especially adapted for use as packaging materials, particularly in the form of rigid transparent protective envelopes for the display of objects on sale in stores. These films can also be used as photographic film base and as base for magnetic tape. Thin films of the material also find use as a dielectric in capacitors.

This same dope was used to coat a film 0.2 mil thick on a polyethylene sheet. The final composite film was used as a packaging material for foods characterized by aromatic and pleasing odors—for example, coffee. Ordinary

*Table 1*

| Example | Polyamide compositions acid or acid mixture | Percent cis diamine | Polyamide viscosity | G. polyamide per 100 ml. aqueous EtOH | Temp. of dope prep., n | Solubility characteristics |
|---|---|---|---|---|---|---|
| V | Pimelic | 90 | 1.13 | 15 | 25 | Soluble, then crystallized on standing. |
| VI | ____do____ | 80 | 1.28 | 15 | 25 | Soluble. |
| VII | ____do____ | 60 | 1.09 | 15 | 25 | Partially soluble: then solution gelled. |
| VIII | ____do____ | 50 | 1.19 | 15 | 25 | Slightly soluble. |
|  |  | 50 | 1.19 | 7.5 | 50 | Do. |
| IX | Adipic | 70 | 1.04 | 15 | 50 | Insoluble. |
| X | Suberic | 70 | 1.07 | 7.5 | 50 | Do. |
| XI | Azelaic | 70 | 0.87 | 7.5 | 50 | Do. |
| XII | Sebacic | 70 | 0.93 | 7.5 | 50 | Do. |
| XIII | 90% pimelic, 10% adipic | 50 | 1.12 | 15.0 | 50 | Partially soluble gelled on cooling. |
|  |  |  |  | 7.5 | 50 | Do. |
| XIV | 75% pimelic, 25% adipic | 50 | 1.40 | 15.0 | 50 | Do. |
|  |  |  |  | 7.5 | 50 | Do. |
| XV | 90% pimelic, 10% adipic | 70 | 1.25 | 15.0 | 25 | Soluble. |
| XVI | 75% pimelic, 25% adipic | 70 | 1.27 | 15.0 | 25 | Do. |

An examination of Examples IV, V, VI, and VII show that the poly(1,4-cyclohexanebismethylpimelamide(s)) prepared from 90–60 percent cis-1,4-cyclohexanebismethylamine are appreciably soluble in aqueous ethanol. At the extremities of this range of compositions (Examples V and VII), the dopes prepared therefrom show a slight tendency toward gelling. However, such gelled dopes can be readily regenerated by warming. The preferred range of cis-1,4-cyclohexanebismethylamine is in the 70–80 percent range (Examples IV and VI). Dopes prepared from these compositions are stable at room temperature.

Outside the above stated range of cis-1,4-cyclohexanebismethylamine contents (Example VIII) or, using acids other than pimelic acid (Examples IX, X, XI, and XII), these polyamides are only slightly soluble in aqueous ethanol.

It is possible to modify the pimelic acid polyamide with a second dicarboxylic acid (Examples XIII, XIV, XV, and XVI). However, a comparison of the composition of Example XIII with that of Example XV and the composition of Example XIV with that of Example XVI demonstrates that at less than the above stated range of cis-polyethylene cannot be used as packaging material for such substances since the odors diffuse through the plastic and are lost. Use of the composite film described above dramatically reduced the loss of aromatic odor and flavor. Consequently, use of this composite film will permit polyethylene to be used profitably in fields where previously it was excluded.

It will thus be seen that we have provided novel and useful compositions for the coating of sheeting and other objects, the formation of film and sheeting and the impregnating of various types of sheeting to render such material more useful in packaging of a wide variety of articles, especially food stuffs. Our compositions are also useful as protective coatings for wooden articles, such as furniture, applied in the form of clear or colored lacquers or other forms of coating compositions. Many other applications of the compositions described herein will be apparent to those skilled in the art to which the invention relates.

Although the invention has been described in considerable detail with particular reference to certain preferred embodiments thereof, variations and modifications can be effected within the spirit and scope of the inven-

We claim:

1. A coating, sheet-forming and impregnating composition comprising a solution containing from 5 to 30 percent by weight of a polyamide derived from the interaction of at least 75 mole percent of pimelic acid and up to 25 mole percent of an aliphatic dicarboxylic acid of 2–20 atoms and a mixture of the cis and trans isomers of 1,4-cyclohexanebismethylamine in which mixture the cis isomer is present to the extent of 60–90 percent and the trans isomer is present to the extent of 40–10 percent, dissolved in aqueous ethanol containing up to 25 percent by volume of water.

2. A coating, sheet-forming and impregnating composition comprising a solution containing from 5 to 30 percent by weight of a polyamide derived from the interaction of at least 75 mole percent of pimelic acid and a mixture of the cis and trans isomers of 1,4-cyclohexanebismethylamine in which mixture the cis isomer is present to the extent of 60–90 percent and the trans isomer is present to the extent of 40–10 percent, dissolved in aqueous ethanol containing up to 25 percent by volume of water.

3. The composition of claim 2 in which the mixture of the cis and trans isomers of 1,4-cyclohexanebismethylamine contains 70–80 percent of the cis isomer and 30–20 percent of the trans isomer.

4. A coating, sheet-forming and impregnating composition comprising a solution containing from 5 to 30 percent by weight of a copolyamide derived from the interaction of at least 75 mole percent of pimelic acid, up to 25 mole percent of adipic acid and a mixture of the cis and trans isomers of 1,4-cyclohexanebismethylamine in which mixture the cis isomer is present to the extent of 60–90 percent and the trans isomer is present to the extent of 40–10 percent, dissolved in aqueous ethanol containing up to 25 percent by volume of water.

5. A film of the polyamide of claim 1.

References Cited by the Examiner
UNITED STATES PATENTS

| | | | |
|---|---|---|---|
| 2,746,941 | 5/1956 | Horn et al. | 260—29.2 |
| 2,882,186 | 4/1959 | Schonberg et al. | 260—29.2 |
| 2,916,476 | 12/1959 | Caldwell et al. | 260—78 |
| 3,012,994 | 12/1961 | Bell et al. | 260—78 |

MURRAY TILLMAN, *Primary Examiner.*